(12) United States Patent
 Crochet, Sr. et al.

(10) Patent No.: US 11,143,331 B2
(45) Date of Patent: *Oct. 12, 2021

(54) BUTTERFLY VALVE AND STEM ASSEMBLY

(71) Applicant: AEGIS FLOW TECHNOLOGIES, L.L.C., Geismar, LA (US)

(72) Inventors: Kevin W. Crochet, Sr., Baton Rouge, LA (US); Norman Eger, Baton Rouge, LA (US); Sidney A. Rovira, St. Amant, LA (US)

(73) Assignee: AEGIS FLOW TECHNOLOGIES, L.L.C., Geismar, LA (US)

( * ) Notice: Subject to any disclaimer, the term of this patent is extended or adjusted under 35 U.S.C. 154(b) by 747 days.

This patent is subject to a terminal disclaimer.

(21) Appl. No.: 15/246,130

(22) Filed: Aug. 24, 2016

(65) Prior Publication Data

US 2016/0363238 A1  Dec. 15, 2016

Related U.S. Application Data

(63) Continuation of application No. 13/928,893, filed on Jun. 27, 2013, now Pat. No. 9,512,926, which is a continuation-in-part of application No. 13/283,168, filed on Oct. 27, 2011, now Pat. No. 8,910,921.

(51) Int. Cl.
 *F16K 5/06* (2006.01)
 *F16K 41/04* (2006.01)
 *F16K 1/226* (2006.01)
 *F16K 31/60* (2006.01)
 *F16K 41/08* (2006.01)

(52) U.S. Cl.
 CPC .......... *F16K 41/046* (2013.01); *F16K 1/2268* (2013.01); *F16K 5/0694* (2013.01); *F16K 31/602* (2013.01); *F16K 41/086* (2013.01)

(58) Field of Classification Search
 CPC .... F16K 5/0694; F16K 5/0657; F16K 5/0689; F16K 41/046; F16K 41/086; F16J 15/3236
 See application file for complete search history.

(56) References Cited

U.S. PATENT DOCUMENTS

| | | | | |
|---|---|---|---|---|
| 3,334,650 A | * | 8/1967 | Stewart, Jr. .......... | F16K 5/0657 137/375 |
| 3,822,068 A | * | 7/1974 | Litherland .......... | F16J 15/3236 277/529 |
| 4,342,444 A | * | 8/1982 | Sonderman .......... | F16K 5/0605 251/315.14 |

(Continued)

*Primary Examiner* — Joseph A Kaufman
(74) *Attorney, Agent, or Firm* — Roy Kiesel Ford Doody & North, APLC

(57) ABSTRACT

A butterfly valve capable of preventing leakage under demanding environmental and operating conditions. The valve includes two stem seal assemblies. The stem seal assemblies include a first pusher, a first energizer, a second pusher, a second energizer, and a force transmitting member. The force transmitting member is configured to transfer an axial load to the second Pusher, which causes the first and second energizer to expand radially to create a secondary and tertiary seals between the stem seal assembly and valve stem. In addition, the force transmitting member is configured to transfer an axial load to the first pusher which creates a primary seal.

24 Claims, 10 Drawing Sheets

SECTION I-I

(56) References Cited

U.S. PATENT DOCUMENTS

| | | | | |
|---|---|---|---|---|
| 4,696,323 A * | 9/1987 | Iff | ............ | F16K 5/0657 |
| | | | | 137/375 |
| 4,903,386 A * | 2/1990 | Teramachi | ............ | B22D 19/12 |
| | | | | 164/97 |
| 5,169,124 A * | 12/1992 | Spears | ............ | F16K 5/0689 |
| | | | | 137/15.22 |
| 5,263,682 A * | 11/1993 | Covert | ............ | F16K 41/046 |
| | | | | 137/312 |
| 5,927,685 A * | 7/1999 | Gosling | ............ | F16K 5/0694 |
| | | | | 137/312 |
| 6,007,070 A * | 12/1999 | Heathcott | ............ | F16J 15/20 |
| | | | | 277/510 |
| 6,557,580 B2 * | 5/2003 | Lohde | ............ | F16K 31/402 |
| | | | | 137/315.01 |
| 7,080,822 B2 * | 7/2006 | Tulaskar | ............ | F16K 5/0642 |
| | | | | 251/315.01 |
| 8,910,921 B2 * | 12/2014 | Crochet, Sr. | ............ | F16K 5/0694 |
| | | | | 251/214 |
| 2008/0029726 A1 * | 2/2008 | Pozzati | ............ | F16J 15/3212 |
| | | | | 251/214 |
| 2011/0147632 A1 * | 6/2011 | Brestel | ............ | F16K 41/026 |
| | | | | 251/214 |

* cited by examiner

SECTION I-I

SECTION II-II

DETAIL III

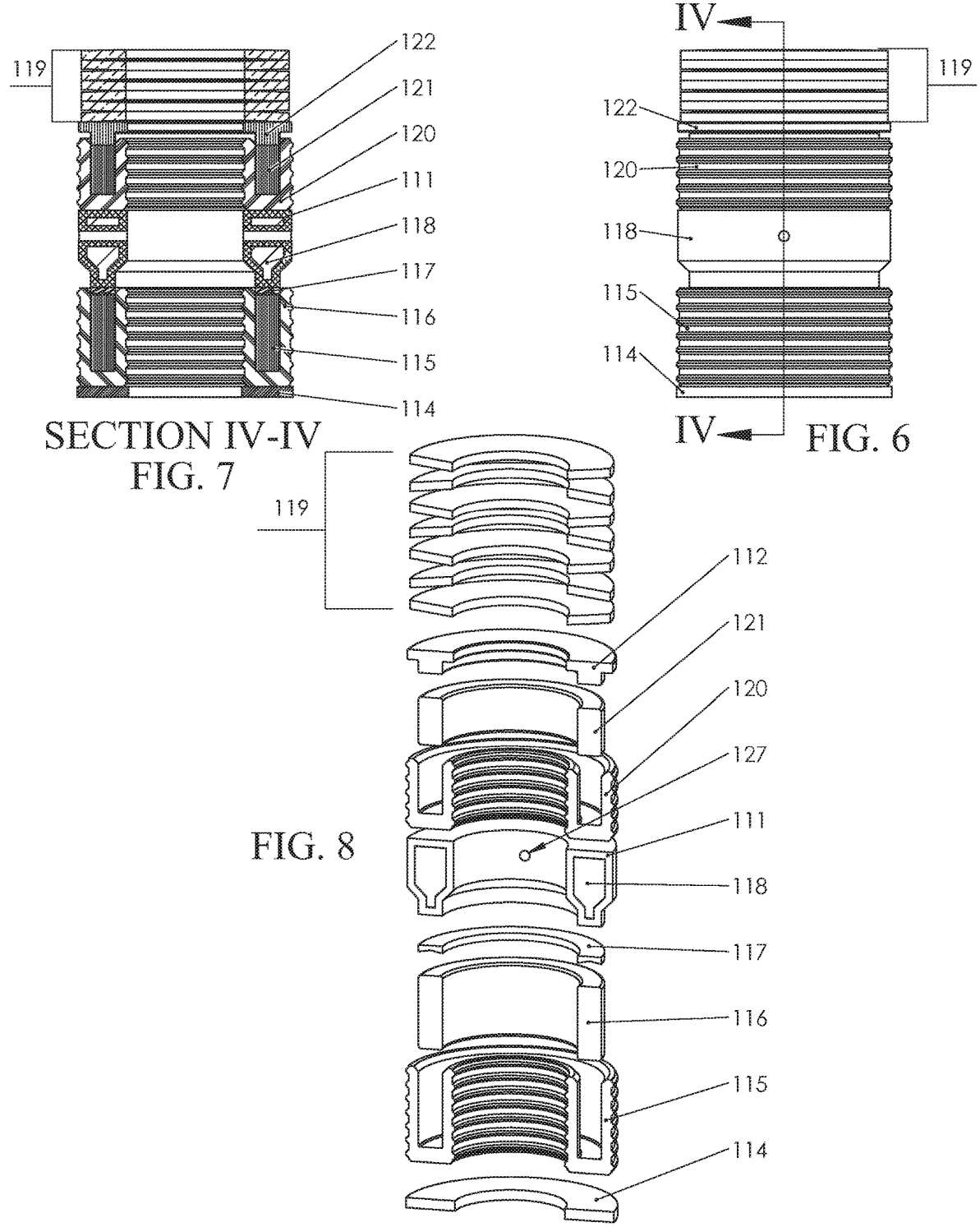

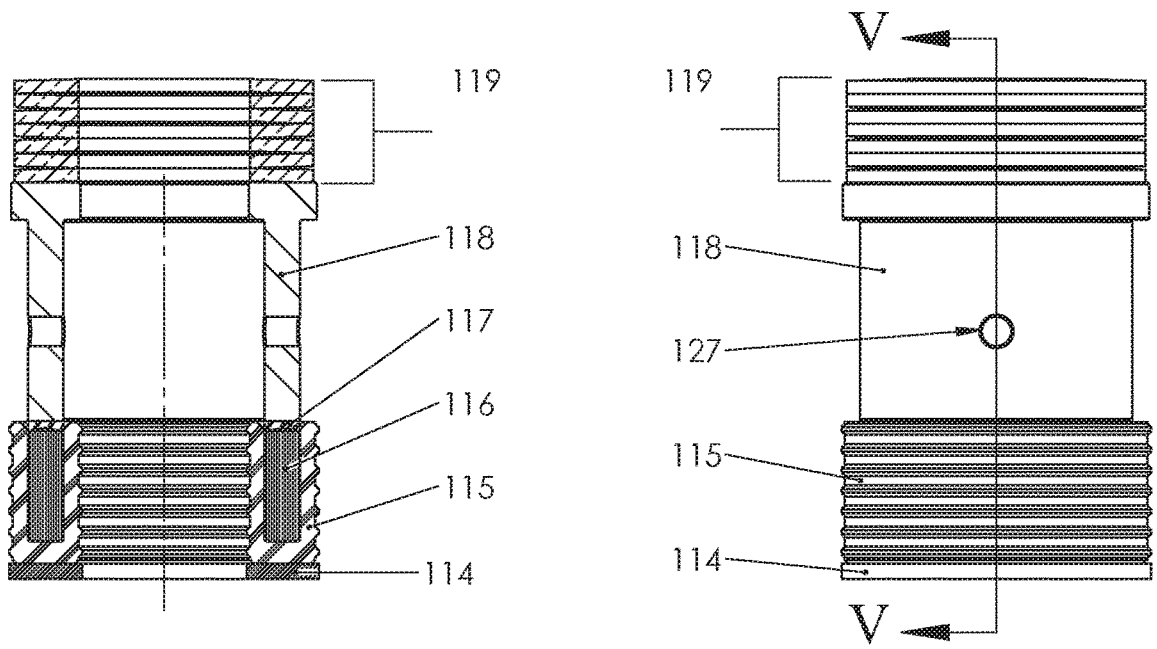
SECTION V-V
FIG. 10
FIG. 9
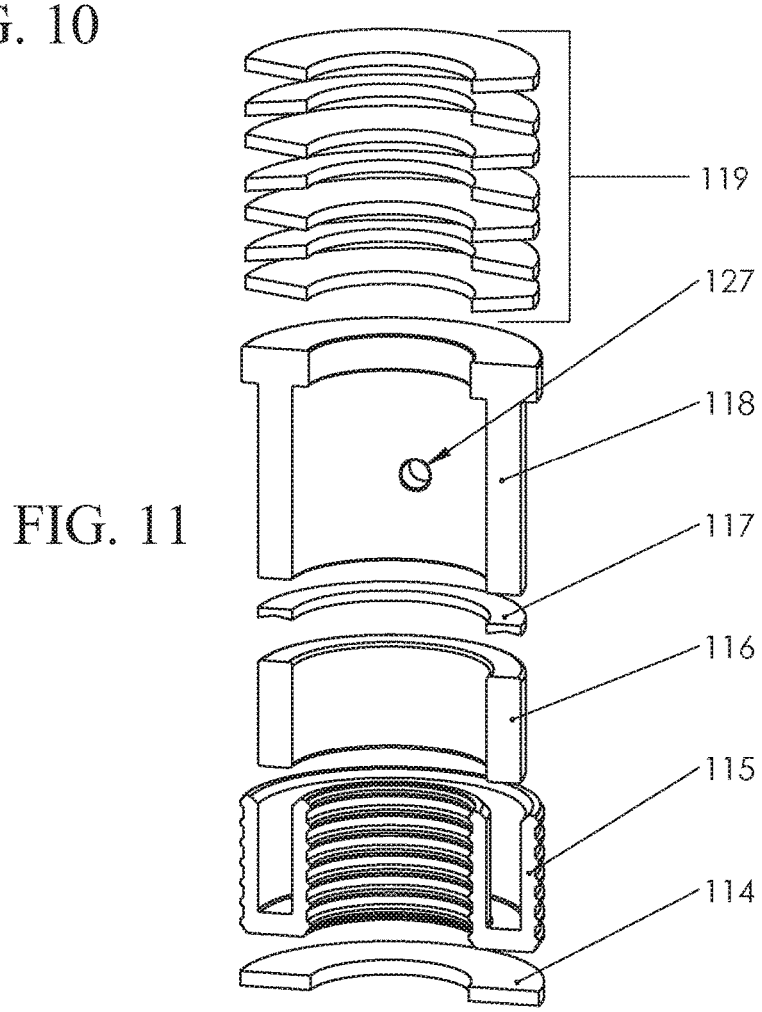
FIG. 11

DETAIL VI

BUTTERFLY VALVE AND STEM ASSEMBLY

CROSS-REFERENCE TO RELATED APPLICATION

This application is a continuation of allowed U.S. patent application Ser. No. 13/928,893, filed on Jun. 27, 2013, which in turn was a continuation it part of U.S. patent application Ser. No. 13/283,168, filed on Oct. 27, 2011. Each patent application identified above is incorporated here by reference in its entirety to provide continuity of disclosure.

STATEMENT REGARDING FEDERALLY SPONSORED RESEARCH OR DEVELOPMENT

Not applicable.

THE NAMES OF HE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

Field of the Invention

The present disclosure relates to means, for regulating flow of a fluid/through a passage, either by closing the passage or restricting it by a definite predetermined motion of the flow-element, and more particularly to devices wherein the valve stem and/or actuator is particularly associated with means to pack or seal it to prevent leakage of fluid between the inside and outside of the valve body.

Description of Related Art

Valves are mechanical devices that are frequently utilized to regulate the flow of fluids, gases and slurries over a wide range of temperatures and pressures. Valves are used in a variety of applications, particularly industrial applications (e.g. refining, chemical, petrochemical, pharmaceutical, etc.), and several different types of valves have been developed to meet the broad range of industrial applications. Examples include ball valves, plug valves, butterfly valves, gate valves, check valves, globe valves, diaphragm, and so forth. Valves may be operated manually by hand or operated mechanically with pneumatic, hydraulic, or electric actuators.

Most valves are provided with a passage containing a flow-element that is positioned within the passage. The flow-element regulates the flow of a fluid, gas or slurry through the passage either by closing the passage or restricting it by a definite predetermined motion of the flow-element. The flow-element has an open position, which allows a fluid, gas or slurry to flow through the passage, and a closed position that prevents a fluid, gas or slurry from flowing through the passage. Examples of flow-elements include, but are not limited to, the ball in a ball valve, the disc in a butterfly valve, and so forth. The flow-element is typically connected to a stem, which actuates the flow-element, either manually or mechanically, between the open position and closed position. Many ball valves are provided with a bonnet, which is fastened to the body of the valve, to secure the flow element and stem in place as well as any sealing or packing means. During operations, a valve stem is frequently moved between the open position and closed position, which may expose the bonnet to rotational stress and loosen the bonnet over time. A loose valve bonnet may cause a fluid, gas or slurry leakage from the valve, which is very undesirable for reasons more fully set forth below.

Valve stems are usually associated with a means to pack or seal it to prevent leakage of fluid between the inside and outside of the valve body. A common means to prevent leakage around the valve stem is a stem seal. However, due to demanding environmental and operating conditions, valve seals are prone to leakage. For example, valves may be exposed to wide and rapid temperature changes, i.e. thermal cycling, causing its seals to contract and expand rapidly, which may degrade the seal over time. In addition, valve seals are sometimes exposed high temperature environments, such as those experienced in fire conditions, which may consume many seal materials.

Other factors that may impact the reliability of a valve seal include vibrations and rotational forces. For example, during operations, a stem seal is frequently exposed to rotational forces as a valve is moved between its open and closed position, which can degrade the integrity of the seal over time causing the valve to leak. Additionally, valves are frequently exposed to high pressure operating conditions and pressure drops, which cause vibrations that may degrade the seal.

Any leakage is very undesirable since it undermines the ability of the valve to control fluid or slurry flow. Moreover, in recent years, environmental regulations have placed a greater emphasis on reducing leaks and other Fugitive emissions from valves in industrial settings by imposing fines and other penalties on facilities that exceed allowable levels. Therefore, in light of the foregoing, a need exists for a more robust valve and stem sealing assembly capable of preventing leakage under demanding environmental and operating conditions.

Furthermore, leaks and/or fugitive emissions from valves are usually identified during field inspections by operations personnel. Field inspections often cannot identify a degrading seal until the valve has already begun to leak. As a result, a valve may leak for a prolonged period of time before it is noticed possibly subjecting personnel to exposure to a hazardous material and/or the facility to fines and other penalties. Therefore, in light of the foregoing, a need exists for a more robust valve and sealing assembly capable of detecting a leak and/or fugitive emission before it is released into the environment.

BRIEF SUMMARY OF THE INVENTION

An object of this invention is to provide a more robust valve and stem sealing assembly capable of preventing leakage under demanding environmental and operating conditions. A further object of this invention is to provide a valve and stem sealing assembly capable of detecting a leak before it is released into the environment Still a farther object of this invention is to provide a valve and stem sealing assembly that prevents a bonnet from turning and loosening during operations. Additional objects and advantages of this invention shall become apparent in the ensuing descriptions of the invention.

Accordingly, a butterfly valve capable of preventing leakage under demanding environmental and operating conditions. The valve includes two stem seal assemblies. The stem seal assemblies include a first pusher, a first energizer, a second pusher, a second energizer, and a force transmitting member. The force transmitting member is configured to transfer an axial load to the second pusher, which causes the first and second energizer to expand radially to create a secondary and tertiary seals between the stein seal assembly and valve stem. In addition, the force transmitting member is configured to transfer an axial load to the first pusher which creates a primary seal. The butterfly valve may also have a second sealing assembly positioned between the body and the flow element.

The foregoing broadly outlines the features and technical advantages of the present invention in order for the following detailed description of the invention to be understood. Additional features and advantages of the invention will be described hereinafter which form the subject of the claims of the invention. It should be appreciated by those skilled in the art that the conception and specific embodiments disclosed may be readily utilized as a basis for modifying or designing other structures for carrying out the same purposes of the present invention.

It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying Figures. It is to be expressly understood, however, that each of the Figures is provided for the purpose of illustration and description only and is not intended as a definition of the limits of the present invention.

BRIEF DESCRIPTION OF THE SEVERAL VIEWS OF THE DRAWING(S)

FIG. 6 is a side view of a stem sealing assembly in accordance with this invention assembly illustrated in FIG. 2.

FIG. 7 is a cross-sectional view of the stem sealing assembly shown in FIG. 6.

FIG. 8 is an exploded view of the stem sealing assembly shown in FIG. 7.

FIG. 9 is a side view of an alternative embodiment of a stem sealing assembly in accordance with this invention in the embodiment of the ball valve illustrated in FIG. 4.

FIG. 10 is a cross-sectional view of the alternative embodiment of the stem sealing assembly shown in FIG. 9.

FIG. 11 is an exploded view of the alternative embodiment of the stem sealing assembly shown in FIG. 10.

DETAILED DESCRIPTION OF THE INVENTION

Figure 1:
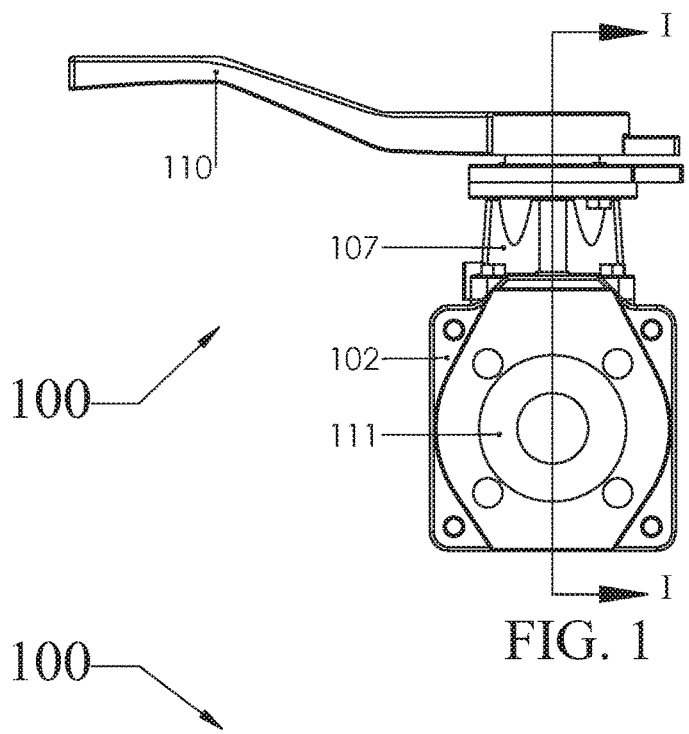
FIG. 1 is a side view of an embodiment of a ball valve in accordance with this invention.
Figure 2:
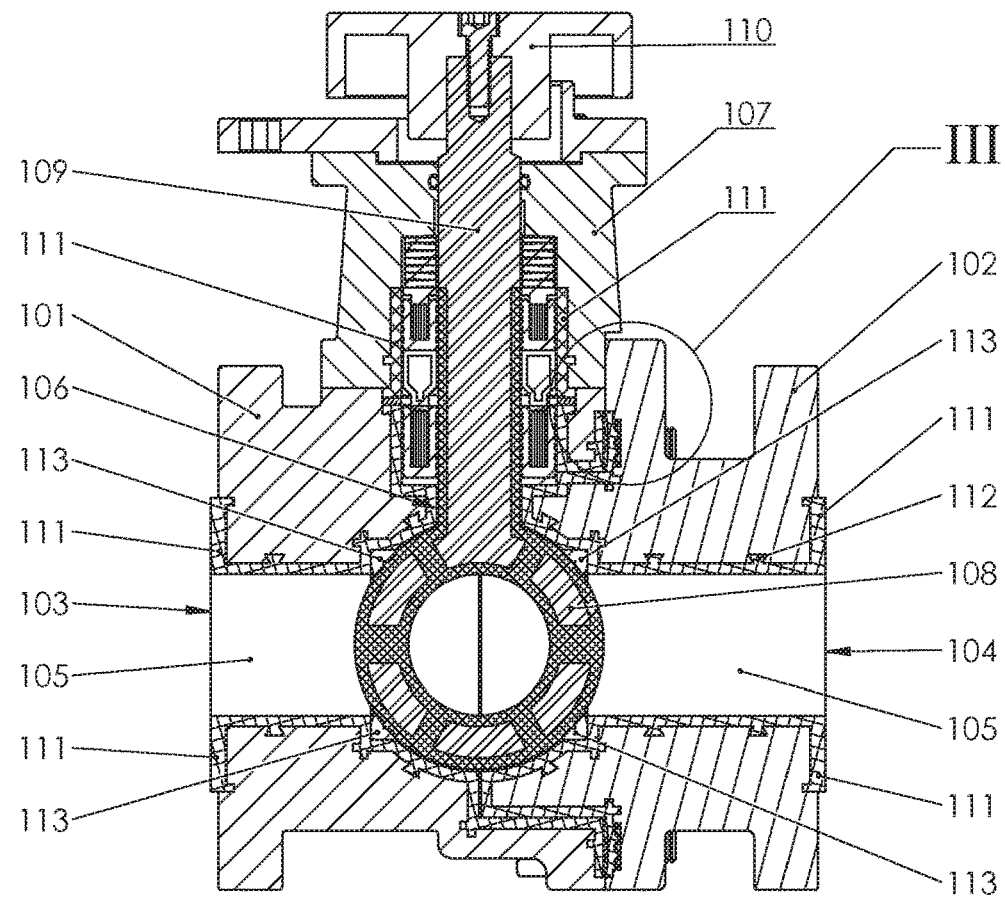
FIG. 2 is a cross-sectional view of the embodiment of the ball valve in FIG. 1.
Figure 3:
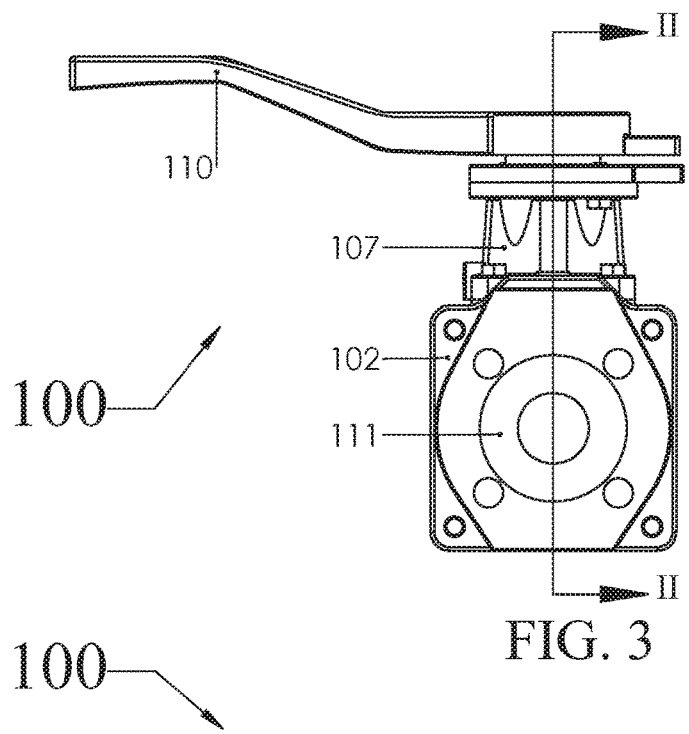
FIG. 3 is a side view of an alternate embodiment of a ball valve in accordance with this invention.
Figure 4:
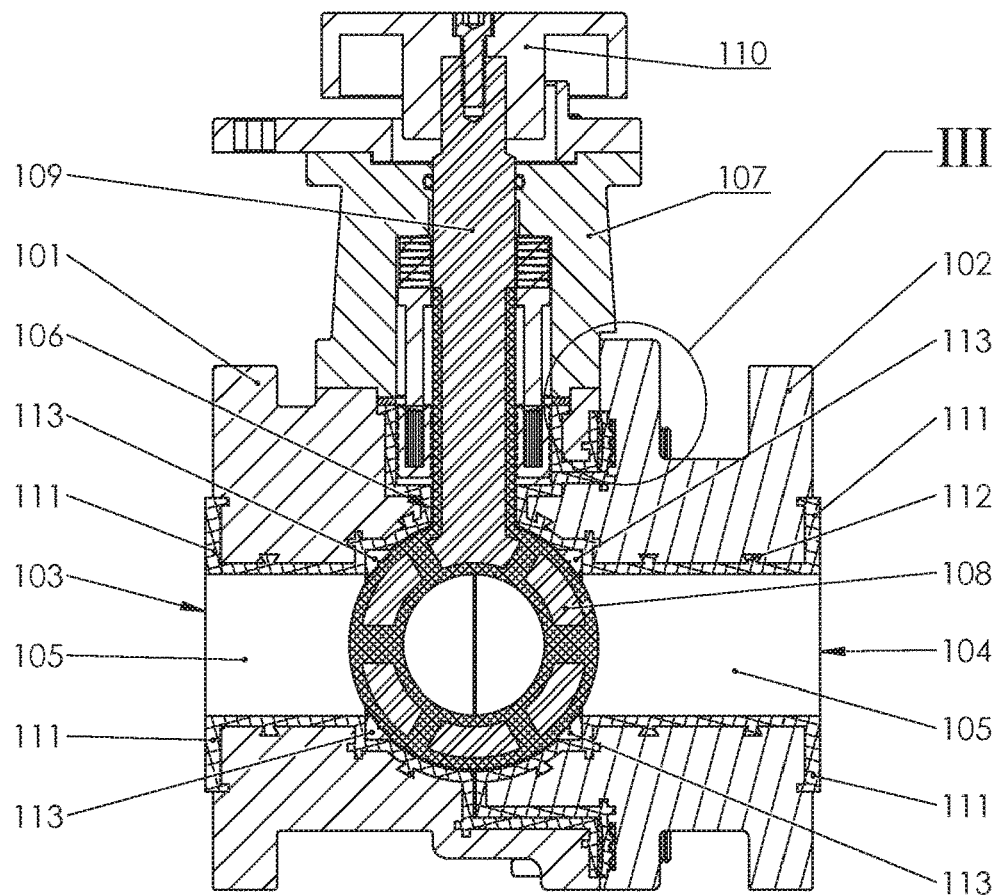
FIG. 4 is a cross-sectional view of the embodiment of the ball valve in FIG. 3.

An embodiment of a valve in accordance with this invention is shown generally in FIG. 1 and FIG. 2 at 100. An alternative embodiment of a valve in accordance with this invention is illustrated generally in. FIG. 3 and FIG. 4 at 100, and discussed in further detail below. The valve 100 comprises a valve body. The valve body may be single body, three piece body, split body, top entry, or welded. In an embodiment, the valve body may be formed by a first body half 101 and a second body half 102 secured together. The first body half 101 may have a flanged connection face that secures to a corresponding flanged connection face on the second body half 102. The first body half 101 and second body half 102 may be secured together by any conventional means such as a threaded, bolted, welded joint, and so forth. The first body half 101 and second body half 102 may be constructed from any suitable material such as carbon steel, stainless steel, nickel alloys, and so forth. As one of ordinary skill in the art appreciates, all materials used in the construction of the valve and sealing assembly elements are selected according to the varying types of applications. The materials are chosen to optimize functional reliability, fluid compatibility, service life and cost.

The first body half 101 and second body half 102 may have a liner 111. The liner 111 may be on flanged faces of the first body half 101 and second body half 102. A seal between the first body half 101 and second body half 102 is created by contact between the liner 111 on the flanged faces both body halves. In an embodiment, the first body half 101 and second body half 102 may be bolted together and constructed from carbon steel and coated with an epoxy paint to prevent corrosion. The bolted connection provides the force necessary to create the seal between the first body half 101 and second body half 102.

Figure 5:
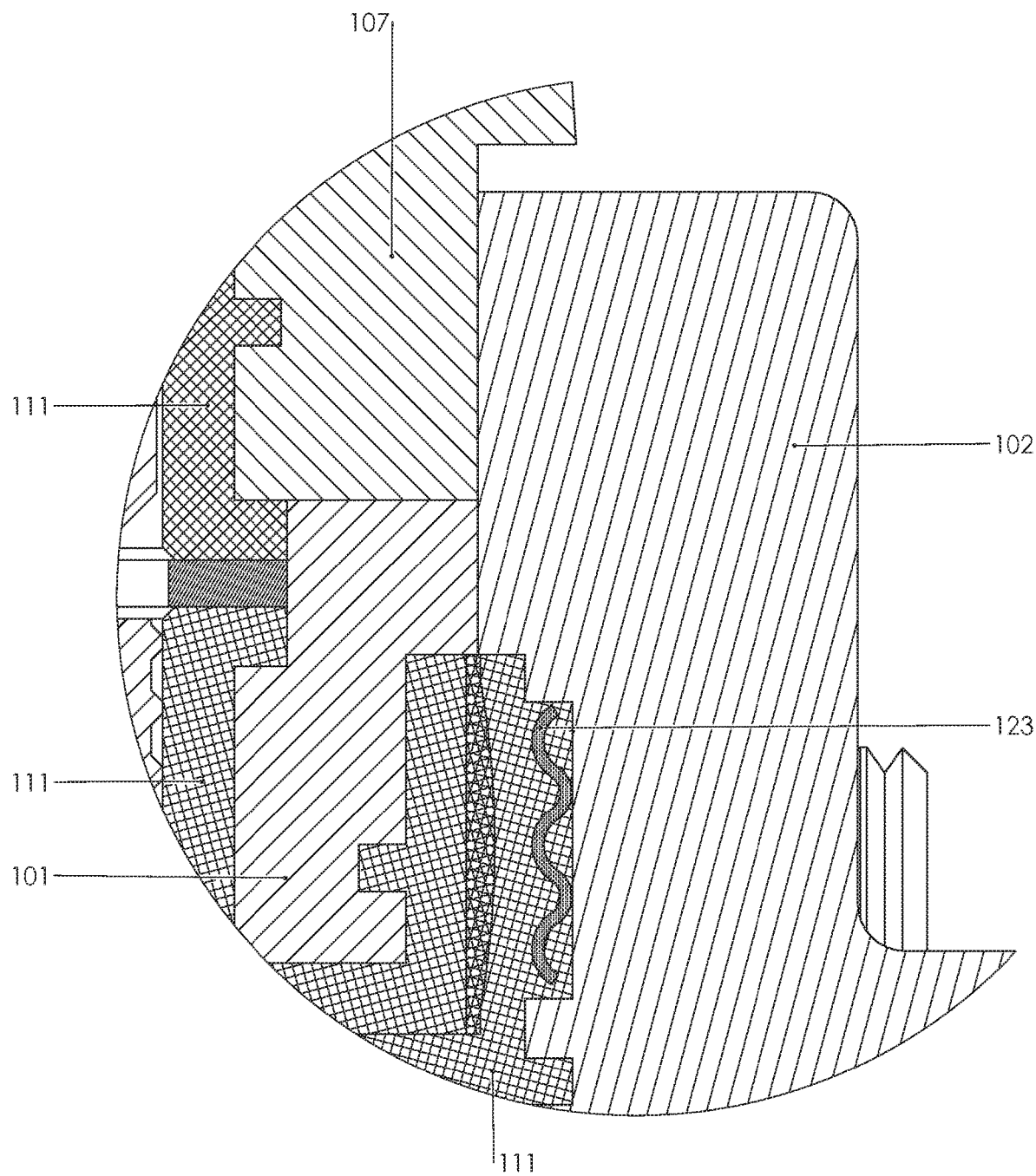
FIG. 5 is a close-up detail view of a body joint in the embodiment of the ball valve in FIG. 2 and FIG. 4.

As shown in FIG. 2, FIG. 4 and FIG. 5, the valve 100 may have a body joint 123 configured to maintain adequate sealing pressure and sealing integrity between the first body half 101 and the second body half 102 thereby reducing the likelihood of a leak path, particularly when a piping system is stressed, compressed, misaligned, or subjected to vibrations or thermal cycling. The body joint 123 provides rigidity or "memory" to the liner 111. The body joint 123 may be an annular disc or spring with several ridges or waves, which extend between the inner and outer circumference of the body joint 123. The body joint 123 is dynamically loaded and energized, and may be encapsulated within a liner 111. In an embodiment, the body joint 123 is located on the flanged face connection of the second body half 102, and encapsulated by the liner 111. The body joint 123 may be preferably located where the flanged faces are connected together, e.g. at the connection points between the first body half 101 and second body half 102.

The valve 100 has a first port 103 and a second port 104 with a passage 105, which is configured to flow a media (fluid, gas or slurry), extending between the first port 103 and second port 104. The valve 100 also has a stem port 106 that extends between the inside and outside of the valve 100. The valve 100 further comprises a bonnet 107. The bonnet 107 acts as a cover on the first body half 101 and second body half 102, and is typically cast or forged of the same material as the first body half 101 and second body half 102. The bonnet 107 may be secured to the first body half 101 and second body half 102 by any conventional means such as a threaded, bolted, welded joint, and so forth.

As shown in FIG. 2 and FIG. 4, a flow-element 108 is positioned between the first port 103 and second port 104. The flow-element 108 may be connected to a stem 109, which actuates the Bow-element 108, either manually or mechanically, between an open position and a closed position. Alternatively, to eliminate hysteresis and prevent lining damage associated with traditional two-piece designs, the flow-element 108 and stem 109 may be fabricated as a single-piece design. The stem 109 extends through the stem port 106, and is connected to an actuator 110. In an embodiment, the actuator 110 may be a manually actuated handle or lever; however, the actuator 110 may also be any conventional means such as pneumatic, hydraulic, electric actuators, and so forth. The flow-element 108 is preferably a full port ball, but it may be any conventional means capable of closing or restricting the passage 105 when it is moved between the open position and closed position. Examples include, but are not limited to, a V-port ball, standard ball, and so forth.

The valve may be provided with a liner 111 to prevent corrosion. The liner 111 is preferably substantially uniformly thick and secured to the surface of the valve 100. The liner 111 may be secured to any surface of the valve 100, but is preferably secured to surfaces that will be exposed to the media. For example, a liner 111 may be secured to the surfaces of the first body half 101 and second body half 102 that define the passage 105, The liner 111 may also be secured to the surfaces of the flow-element 108, and stem 109.

The liner 111 may be secured to the valve 100 by any conventional means. In an embodiment, the liner is secured to the first body half 101, second body half 102, and bonnet 107 by a series of dovetail groves and interlocking holes 112 on body of the valve, which facilitate the handling of process pressure, vacuum, thermal cycling, and temperature cycling. As one of ordinary skill in the art appreciates, the liner 111 material may be selected based on the application of the valve. In corrosive applications (e.g. chlorine, hydrochloric acid, etc.), the liner 111 may be constructed from a fluoropolymer and thermoplastic material such as fluorinated ethylene propylene (FEP), perfluoroalkoxy (PFA), polyvinylidenefluoride (PVDF), and so forth.

Internal seats 113 are interposed between the flow element 113 and the valve body. The internal seats 113 are configured and designed to prevent leakage within the valve 100. In an embodiment, the internal seats 113 are positioned between the void space between the flow element 108 and the first body half 101 and second body half 102. The material of construction of the internal seats 113 is largely dependent on the temperature, pressure, and type of media flowing through the valve 100. As one of ordinary skill in the art appreciates, the internal seats 113 are preferably constructed from any material capable of resisting the effects of chemical attack, absorption, swelling, cold flow, and permeation with respect to a media. Suitable materials include, but are not limited to, fluoroplastic materials such as polytetrafluoroethylene (PTFE), fluorinated ethylene propylene (FEP), perfluoroalkoxy (PFA), polyvinylidenefluoride (PVDF), and so forth.

The valve 100 further comprises a stem seal assembly as shown in FIG. 2. FIG. 4 illustrates a valve 100 with an alternate embodiment of a stem seal assembly. The stem seal assembly is utilized to prevent leakage of a media from the inside to the outside of the valve 100. The stem seal assembly is substantially adjacent to the stem 109. In an embodiment, the stem seal assembly is configured to fit within an annular space defined by the area between the stem 109 and the first body half 101, second body half 102, and bonnet 103. Alternatively, if the first body half 101, second body half 102, and bonnet 103 are provided with a liner, the stem seal assembly may be configured to fit within an annular space defined by the area between the stem 109 and liner 111.

An embodiment of a stem seal assembly shown in FIG. 2 is illustrated in FIG. 6, FIG. 7, and FIG. 8. The stem seal assembly is a dynamic sealing system that has the advantages of being virtually maintenance free and requiring no adjustment in the field. The stem seal assembly may also serve as a bearing and assist with reducing lateral forces that may be placed on the flow-element 108 and stent 109. The stem seal assembly comprises a bottom gasket 114, a primary seal 115, primary shaft insert 116, seal 117, spacer 118, secondary seal 120, secondary shaft insert 121, support ring 122, and force transmitting member 119. The secondary seal 120 and secondary shaft insert 122 provide a backup seal if the primary seal 115 is compromised.

The bottom gasket 114 is seated in the bottom of the annular space. The bottom gasket 114 may have an interface on its top surface configured to substantially mate with the bottom surface of the primary seal 115. In an embodiment, to prevent the passage of a media, the outer circumference of the bottom gasket 114 is configured to substantially fit with the valve stem, and the inner circumference of the bottom gasket 114 is configured to substantially fit with the valve body or valve body liner 111. The bottom gasket 114 may be constructed from any material resistant to the media passing through the valve. Suitable materials include but are not limited to a thermoplastic or fluoroplastic material such as polytetrafluoroethylene (PTFE) or other suitable material.

The primary seal 115 is seated in the annular space above the bottom gasket 114. The primary seal 115 is seated on the top surface of the bottom gasket 114. In an embodiment, the bottom surface of the primary seal 115 is configured to substantially mate with the top surface of the bottom gasket 114, and sits on top of the top surface of the bottom gasket 114. The primary seal 115 may have a cavity between the inner circumference and outer circumference of the primary seal 115. The cavity is preferably sized and configured to receive the primary shaft insert 116. In an embodiment, the cavity is a U-cup shape. As shown in FIG. 8, the cavity extends between the inner and outer circumference of the primary seal 115 and from the top to the bottom of the primary seal 115. The outer and inner circumference of the primary seal 115 may have a plurality of ribs. The ribs on the inner and outer circumference of the primary seal 115 enact a seal with the walls of the annular space. Alternatively, if the first body half 101, second body half 102, and bonnet 103 are provided with a liner, the primary seal 115 creates a seal with the walls of the annular space defined as the area between the stem 109 and liner 111. The primary seal 115 may be constructed from any material resistant to the media passing through the valve 100. Suitable materials include but are not limited to thermoplastic or fluoroplastic materials such as polytetrafluoroethylene (PTFE), fluorinated ethylene propylene (FEP), perfluoroalkoxy (PFA), polyvinylidenefluoride (PVDF), and so forth.

The primary shaft insert 116 is seated in the annular space above the bottom gasket 114, and is sized and configured to fit within the cavity of the primary seal 115. In an embodiment, the primary shaft insert 116 fits within a cavity that is U-cup shape as shown in FIG. 8. The U-cup design of the primary seal 120 and primary shaft insert 121 allows looser tolerances for these elements than typical packing systems because these elements have the ability to expand radially when subjected to an axial load thereby filling any voids caused by loose tolerances and fit. The primary shaft insert 116 may be constructed from any material capable of expanding radially when subjected to an axial load. Suitable materials include but are not limited to a synthetic rubber and fluoropolymer elastomer such as Viton, or other suitable material.

Located above the primary seal 115 and primary shaft insert 116 is a seal 117, which is seated in the annular space. In an embodiment, the seal 117 may be a vee seal. The seal 117 sits on the top surface of the primary seal 115 and primary shaft insert 116. The seal 117 may be constructed from any material resistant to the media passing through the valve. Suitable materials include but are not limited to thermoplastic or fluoroplastic materials such as polytetrafluoroethylene (PTFE), fluorinated ethylene propylene (FEP), perfluoroalkoxy (PFA), polyvinylidenefluoride (PVDF), and so forth.

A spacer 118 sits on top of the seal 117. The spacer 118 sits within the annular space above the seal 117, The spacer 118 is configured to align with the leakoff connection 128 on the bonnet 107. In an embodiment, the spacer 118 may be a lantern ring with an aperture 127 configured to align with the leakoff connection 128. The spacer 118 may be constructed from any material sufficiently resistant to the media passing through the valve. Suitable materials include metals such as stainless steel. In an embodiment, the spacer 118 may have a liner 111. As one of ordinary skill in the art appreciates, the liner 111 material may be selected based on the application of the valve. For example, in corrosive applications, the liner 111 may be constructed from a fluoropolymer and thermoplastic material such as fluorinated ethylene propylene (FEP), perfluoroalkoxy (PFA), polyvinylidenefluoride (PVDF), and so forth.

The secondary seal 120 is seated in the annular space above the spacer 118. The secondary seal 120 is seated on the top surface of the spacer 118. The secondary seal 120 may have a cavity between the inner circumference and outer circumference of the secondary seal 120. The cavity is preferably sized and configured to receive the secondary shaft insert 121. In an embodiment, the cavity is a U-cup shape. As shown in FIG. 8, the cavity extends between the inner and outer circumference of the secondary seal 115 and from the top to the bottom of the secondary seal 115. The outer and inner circumference of the secondary seal 115 may have a plurality of ribs. The ribs on the inner and outer circumference of the secondary seal 115 enact a seal with the walls of the annular space. Alternatively, if the first body half 101, second body half 102, and bonnet 103 are provided with a liner, the secondary seal 120 creates a seal with the walls of the annular space defined as the area between the stem 109 and liner 111. The secondary seal 120 may be constructed from any material resistant to the media passing through the valve 100. Suitable materials include but are not limited to thermoplastic or fluoroplastic materials such as polytetrafluoroethylene (PTFE), fluorinated ethylene propylene (FEP), perfluoroalkoxy (PFA), polyvinylidenefluoride (PVDF), and so forth.

The secondary shaft insert 121 is seated in the annular space above the seal 117, and is sized and configured to fit within the cavity of the secondary seal 120. In an embodiment, the secondary shaft insert 121 fits within a cavity that is U-cup shape. The U-cup design of the secondary seal 120 and secondary shaft insert 121 allows looser tolerances for these elements than typical packing systems because these elements have the ability to expand radially when subjected to an axial load thereby filling any voids caused be loose tolerances and fit. The secondary shaft insert 121 may be constructed from any material capable of expanding radially when subjected to an axial load. Suitable materials include but are not limited to a synthetic rubber and fluoropolymer elastomer such as Viton, or other suitable material.

Located above the secondary seal 120 and secondary shaft insert 121 is a support ring 122. In an embodiment, the support ring 122 may be a stainless steel Belleville support ring. Within the annular space above, the support ring 122, a force transmitting member 119 is seated on top of the support ring 122. The force transmitting member 119 may be a spring washer such as a Belleville spring washer. The force transmitting member 119 is configured to transfer an axial load to the primary shaft insert 116 and secondary shaft insert 121. The primary shaft insert 116 and secondary shaft insert 121 then transfer the load radially creating a seal force along the cavity between the area defined by inner circumference and outer circumference of the primary seal 115 and secondary seal 120. The primary seal 115 and secondary seal 120 are then pushed outward creating a seal with the walls of the annular space. Alternatively, if the first body half 101, second body half 102, and bonnet 103 are provided with a liner, the primary seal 115 and secondary seal 120 create a seal with the walls of the annular space defined as the area between the stem 109 and liner 111.

An embodiment of a stem seal assembly shown in FIG. 4 is illustrated in FIG. 9, FIG. 10 and FIG. 11. The stem seal assembly comprises a bottom gasket 114, primary seal 115, primary shaft insert 116, seal 117, spacer 118, and Force transmitting member 119. The bottom gasket 114 is seated in the bottom of the annular space. The bottom gasket 114 may have an interface on its top surface configured to substantially mate with the bottom surface of the primary seal 115. In an embodiment, to prevent the passage of a media, the outer circumference of the bottom gasket 114 is configured to substantially fit with the valve stem 109, and the inner circumference of the bottom gasket 114 is configured to substantially fit with the valve body or liner 111. The bottom gasket 114 may be constructed from any material resistant to the media passing through the valve 100. Suitable materials include but are not limited to a thermoplastic or fluoroplastic material such as polytetrafluoroethylene (PTFE) or other suitable material.

The primary seal 115 is seated in the annular space above the bottom gasket 114. The primary seal 115 is seated on the top surface of the bottom gasket 114. In an embodiment, the bottom surface of the primary seal 115 is configured to substantially mate with the top surface of the bottom gasket 114, and sits on top of the top surface of the bottom gasket 114. The primary seal 115 may have a cavity between the inner circumference and outer circumference of the primary seal 115. The cavity is preferably sized and configured to receive the primary shaft insert 116. In an embodiment, the cavity is a U-cup shape. As shown in FIG. 11, the cavity extends between the inner and outer circumference of the primary seal 115 and from the top to the bottom of the primary seal 115. The outer and inner circumference of the primary seal 115 may have a plurality of ribs. The ribs on the inner and outer circumference of the primary seal 115 enact a seal with the walls of the annular space. Alternatively, if the first body half 101, second body half 102, and bonnet 103 are provided with a liner, the primary seal 115 and secondary seal 120 create a seal with the walls of the annular space defined as the area between the stem 109 and liner 111. The primary seal 115 may be constructed from any material resistant to the media passing through the valve. Suitable materials include but are not limited to thermoplastic or fluoroplastic materials such as polytetrafluoroethylene (PTFE), fluorinated ethylene propylene (FEP), perfluoroalkoxy (PFA), polyvinylidenefluoride (PVDF), and so forth.

The primary shaft insert 116 is seated in the annular space above the bottom gasket 114, and is sized and configured to fit within the cavity of the primary seal 115. In an embodiment, the primary shaft insert 116 fits within a cavity that is U-cup shape. The U-cup design of the primary seal 115 and primary shaft insert 116 allows looser tolerances for these elements than typical packing systems because these elements have the ability to expand radially when subjected to an axial load thereby filling any voids caused by loose tolerances and fit. The primary shaft insert 116 may be constructed from any material capable of expanding radially when subjected to an axial load. Suitable materials include but are not limited to a synthetic rubber and fluoropolymer elastomer such as Viton, or other suitable material.

Located above the primary seal 115 and primary shaft insert 116 is a seal 117, which is seated in the annular space. In an embodiment, the seal 117 may be a vee seal. The seal 117 sits on the top surface of the primary seal and primary shaft insert. The seal 117 may be constructed from any material resistant to the media passing through the valve. Suitable materials include but are not limited to thermoplastic or fluoroplastic materials such as polytetrafluoroethylene (PTFE), fluorinated ethylene propylene (FEP), perfluoroalkoxy (PFA), polyvinylidenefluoride (PVDF), and so forth.

A spacer 118 sits on top of the seal 117. The spacer 118 sits within the annular space above the seal 117. The spacer 118 is configured to align with the leakoff connection 128 on the bonnet 107. In an embodiment, the spacer 118 may be a lantern ring with an aperture 127 configured to align with the leakoff connection 128. The spacer 118 may be constructed from any material sufficiently resistant to the media passing through the valve. Suitable materials include metals such as stainless steel. Within the annular space above the spacer 118, a force transmitting member 119 is seated on top of the surface of the spacer 118. The force transmitting member 119 may be a spring washer such as a Belleville spring washer. The force transmitting member 119 is configured to transfer an axial load to the primary shaft insert 116. The primary shaft insert 116 then transfers the load radially creating a seal force along the cavity between the area defined by inner circumference and outer circumference of the primary seal 115. The primary seal 115 is then pushed outward creating a seal with the walls of the annular space.

Alternatively, if the first body half 101, second body half 102, and bonnet 103 are provided with a liner, the primary seal 115 creates a seal with the walls of the annular space defined as the area between the stem 109 and liner 111.

The valve 100 may include a leak detection port that extends from the leakoff connection 128 on the outside of the valve to an annulus above the primary seal 115. In an embodiment, the leak detection port extends from the outside of the valve to an annulus between the primary seal 115 and secondary seal 120. The leak detection port is utilized to detect whether any leakage occurs around the sealing assembly.

Figure 12:
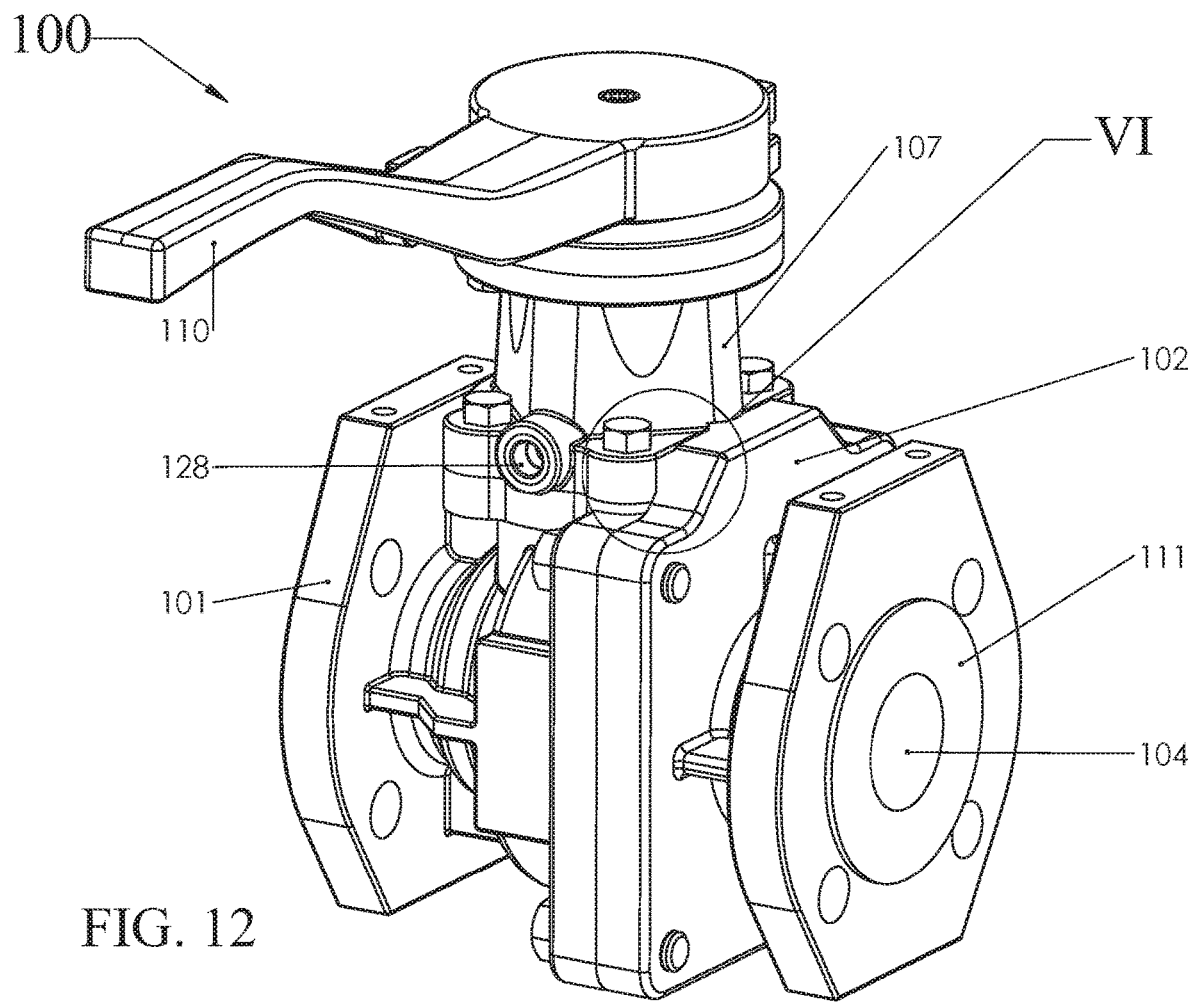
FIG. 12 is a perspective view of a ball valve in accordance with this invention.
Figure 13:
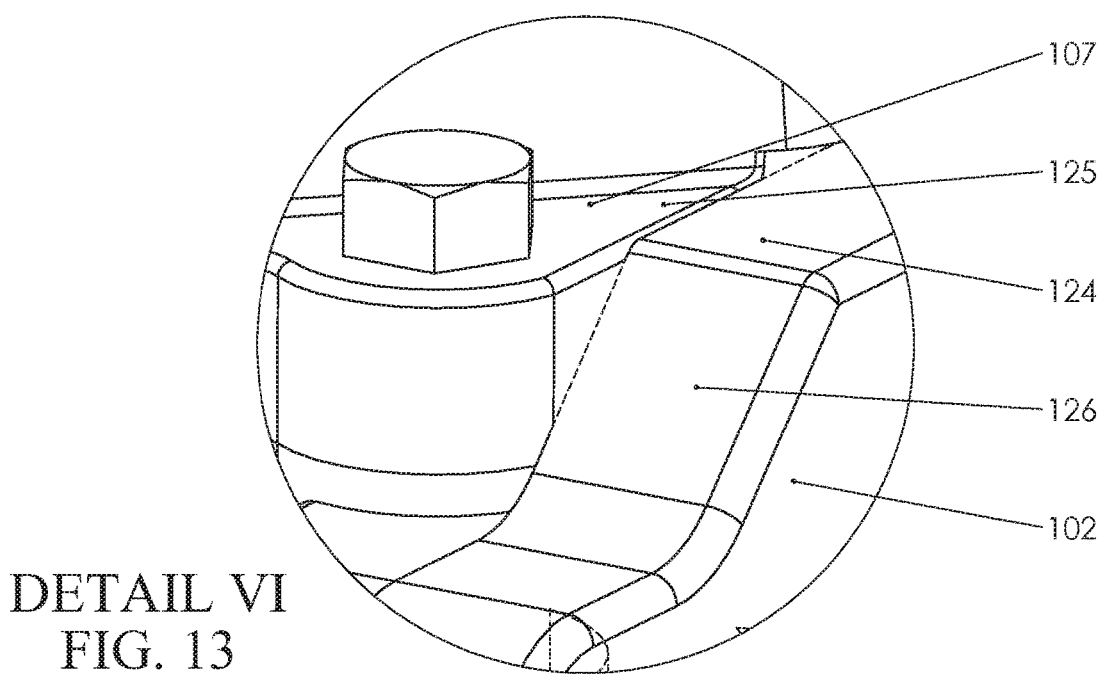
FIG. 13 is a close-up detail view of an anti-rotational bonnet and body interface in accordance with this invention.
Figure 15:
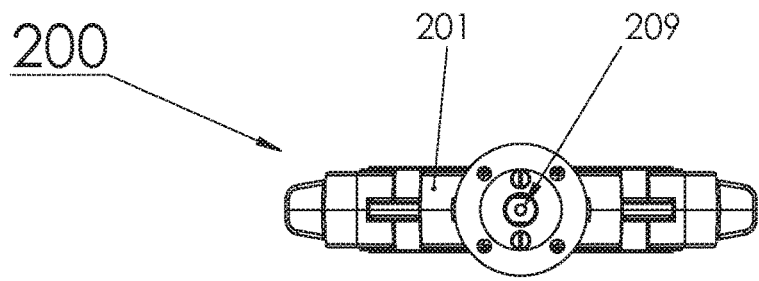
FIG. 15 is a top view of the butterfly valve shown in FIG. 14.
Figure 14:
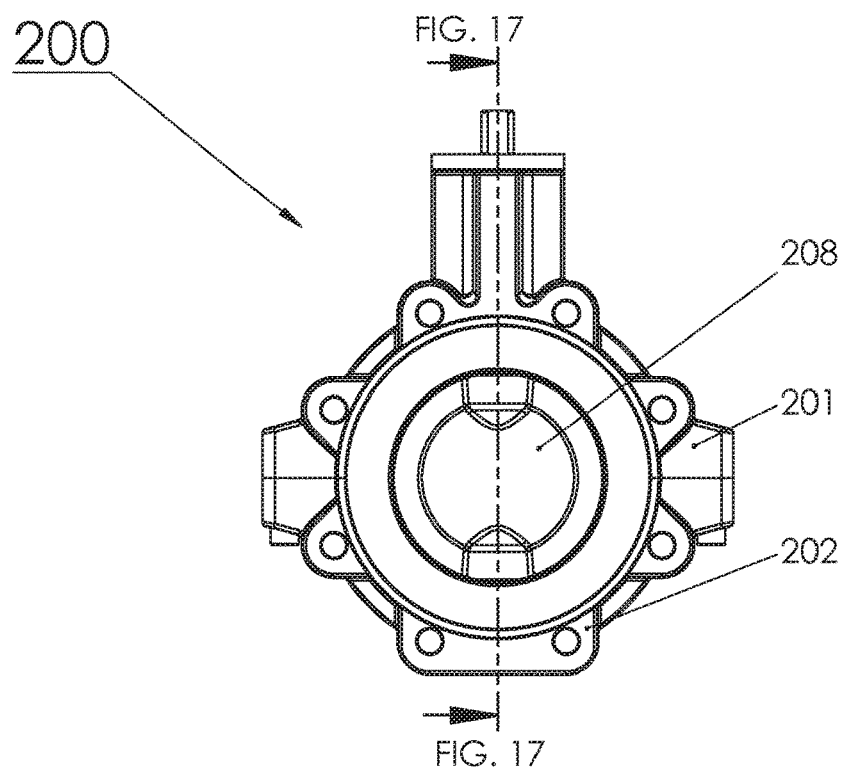
FIG. 14 is an embodiment of a butterfly valve in accordance with this invention.
Figure 16:
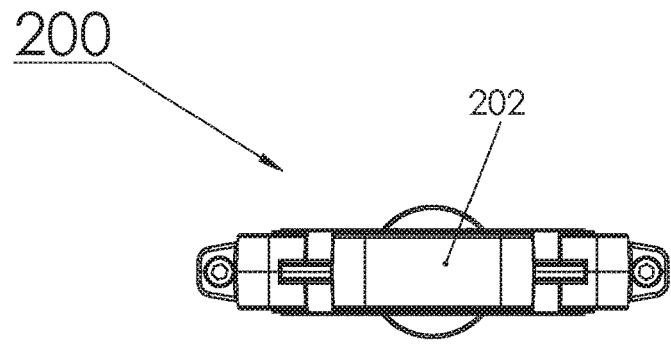
FIG. 16 is a bottom view of the butterfly valve shown in FIG. 14.

As shown in FIG. 12 and FIG. 13, the interface between the bonnet 107 and valve body is configured to eliminate rotational forces from being translated to the bonnet 107. In an embodiment, a flanged bolted connection on the bonnet 107 secures the bonnet 107 to the valve body. The top edge of the flanged connection 125 on the bonnet 107 may be substantially flat. When the bonnet 107 is secured to the body, the top edge of the flanged connection 125 on the bonnet 107 is preferably substantially flush with the top edge 124 of the second body half lip 126 creating a substantially flat planar surface between the top edge of the flanged connection 125 on the bonnet 107 and the top edge of the second body half lip 126. In addition, a notched interface 129 between the bonnet 107 and second body half 102 eliminates rotational forces from being translated to the bonnet 107 bolts, which maintains the sealing integrity of the seal between the body 101 and the bonnet 107, i.e. the bonnet 107 is prevented from turning accidentally during operation. As one of ordinary skill in the art appreciates, to prevent rotation during operation, the top edge 124 of the lip 126 of the second body half 102 should be of sufficient height to provide enough resistance to counteract the force from the bonnet 107. For example, to prevent bonnet 107 rotation, the top edge 124 of the lip 126 of the second body half 102 may be higher than the top edge of the flanged connection 125 on the bonnet 107.

In an embodiment, during assembly of a valve, the first body half 101 is bolted together with the second body half 102. A seal is created between the first body half 101 and second body half 102 between the liner 111 on the flanged faces both body halves. As shown in FIG. 2, FIG. 4 and FIG. 5, the valve 100 has a body joint 123 configured to maintain the sealing integrity between the first body half 101 and the second body half 102. The body joint is located on flanged connection of the second body half 102 and encapsulated by the liner 111. The body joint 123 provides rigidity or almost "memory" to the liner 111. When the first body half is bolted to the second body half a sealing force is created, which dynamically loads and energizes the body joint 123. The energized body joint 123 maintains adequate sealing pressure and sealing integrity between the first body half 101 and the second body half 102 thereby reducing the likelihood of a leak path, particularly when a piping system is stressed, compressed, misaligned, or subjected to vibrations. As shown in FIG. 5, the body joint 123 is located at the connection points between the first body half 101 and second body half 102, e.g. the body joint 123 is located around the bolt connection point between the first body half 101 and second body half 102 and encapsulated in the liner 111 on the second body half 102.

The sealing assembly encompasses the stein 109. As the spring washer 119 is loaded, it transfers transfer an axial load to the primary shaft insert 116 and secondary shaft insert 121. The primary shaft insert 116 and secondary shaft insert 121 then transfer the load radially creating a seal force along the cavity between the area defined by inner circumference and outer circumference of the primary seal 115 and secondary seal 120. The primary seal 115 and secondary seal 120 are then pushed outward creating a seal with the walls of the annular space defined as the area between the stem 109 and the first body half 101, second body half 102, and bonnet 103. Alternatively, if the first body half 101, second body half 102, and bonnet 103 are provided with a liner, the primary seal 115 and secondary seal 120 create a seal with the walls of the annular space defined as the area between the stem 109 and liner 111. The bonnet 107 is bolted to the first body half and second body half. The bonnet 107 acts as a cover for the first body half 101 and second body half 102 and is configured to secure the sealing assembly.

Although aspects of the present invention(s) are described in relation to a ball valve, the invention(s) is not limited to such use. In an embodiment shown in FIGS. 14-20, aspects of this invention(s) can be utilized in a butterfly valve. The butterfly valve 200 comprises a body, a stem 209, a flow element 208, and two stem seal assemblies.

The body may be formed from a top body half 201 and a bottom body half 202. The top body half 201 and bottom body half 202 are secured together by any conventional means such as a threaded, bolted, welded joint, and so forth. The top body half 201 and bottom body half 202 may be constructed from any suitable material such as carbon steel, stainless steel, nickel alloys, and so forth. As one of ordinary skill in the art appreciates, all materials used in the construction of the valve and sealing assembly elements are selected according to the varying types of applications. For example, materials can be selected to optimize functional reliability, fluid compatibility, service life and cost.

When the top body half 201 and bottom body half 202 are secured together, an annular opening is formed between the two body halves. The flow element 208 is positioned in the annular opening. The flow-element 208 can be a circular disc or vane that pivots. The flow-element 208 can be fabricated as a two-piece design or as a single piece design. The flow-element 208 is connected to a stem 209, which extends through the top body half 201, and is configured to manually or mechanically actuate the flow-element 208 between an open position and a closed position.

Figure 19:
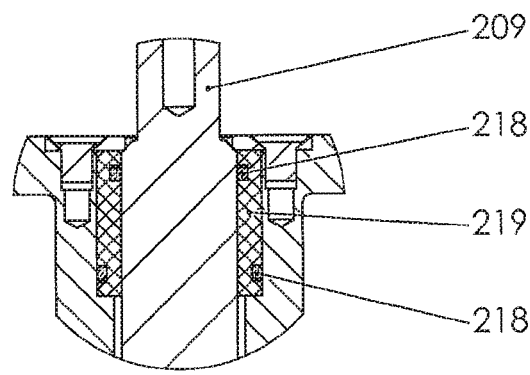
FIG. 19 is a close-up detail view of the upper embodiment of the stem sealing assembly for the butterfly valve shown in FIG. 14.

The stem 209 can be connected to an actuator. The actuator may be a manually actuated handle or lever; however, the actuator may also be any conventional means such as pneumatic, hydraulic, electric actuators, and so forth. When the flow element 208 is actuated, it seals against body liner in the annular opening. As shown in FIG. 19, the stem can be surrounded by a stem bushing 219 to keep the stem concentric and provide an object for the stem 209, The stem bushing 219 can be made from an acetal resin such as Derlin® available from DuPont®. The stem bushing 219 may include one or more seals. In an embodiment, the stem bushing can have an inner 218a and outer seal 218b. The seals 218a, 218b may be O-rings.

The butterfly valve can have a liner 211 to prevent corrosion. The liner 211 is preferably substantially uniformly thick and secured to the surface of the butterfly valve 200. The liner 211 may be secured to any surface of the butterfly valve 200, but is preferably secured to surfaces that will be exposed to the media. For example, a liner 211 may be secured to the surfaces of the top body half 201 and bottom body half 202 that define the annular opening. The liner 211 may also be secured to the surfaces of the flow-element 208 and/or stem 209. The liner 211 material may be selected based on the application of the butterfly valve 200. In corrosive applications (e.g. chlorine, hydrochloric acid, etc.), the liner 211 may be constructed from a fluoropolymer and thermoplastic material such as fluorinated ethylene propylene (FEP), perfluoroalkoxy (PFA), polyvinylidene-fluoride (PVDF), and so forth.

The first stem seal assembly is located substantially adjacent to the stem 209, and configured for preventing leakage of a media from the inside to the outside of the butterfly valve 200. The first stem seal assembly is seated within an annular space defined by the area between the stem 209 and the top body half 201. In addition, a second seal assembly can be positioned between the bottom body half 202 and the flow element 208.

Figure 17:
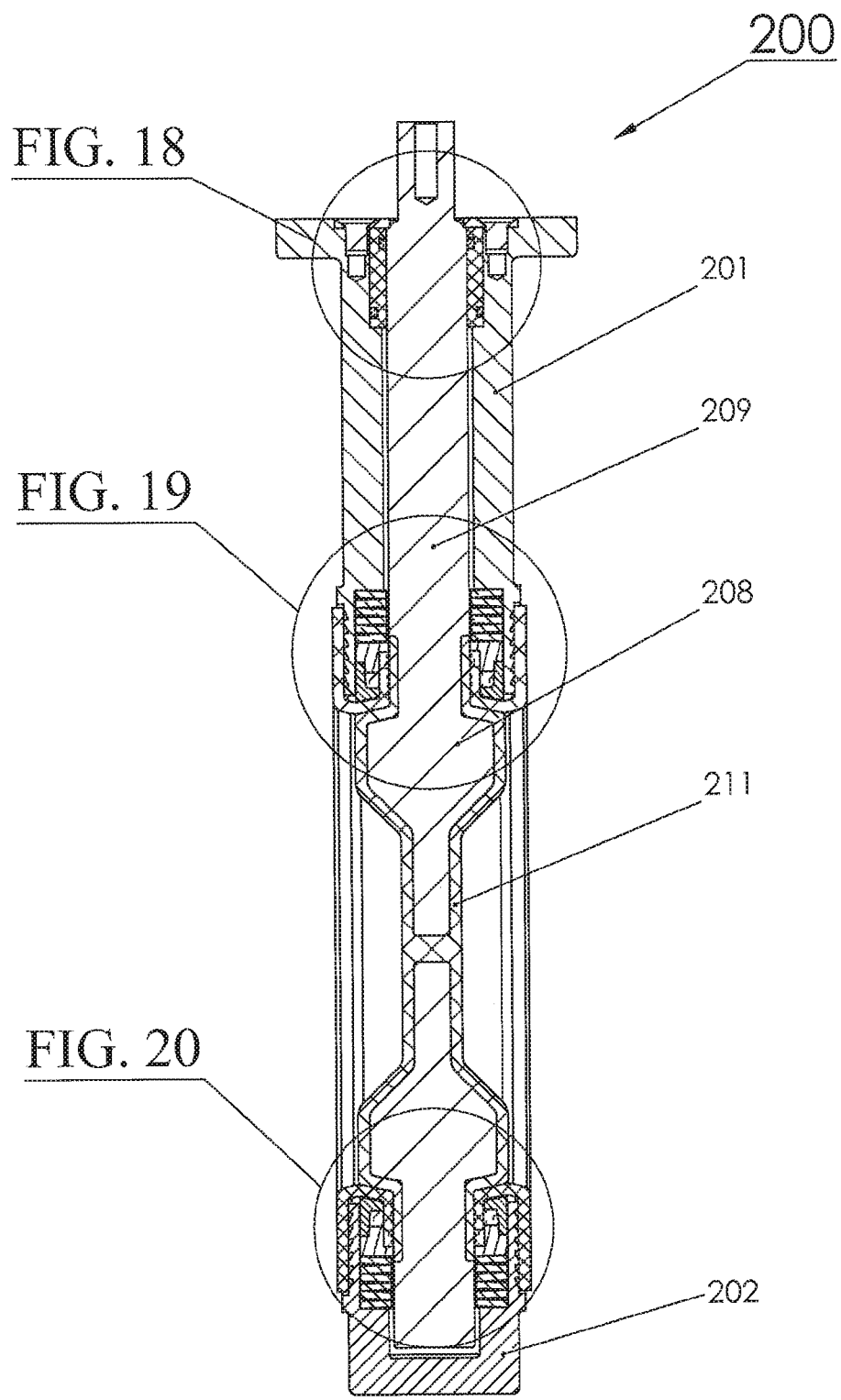
FIG. 17 is a cross-sectional view of the butterfly valve shown in FIG. 14.
Figure 18:
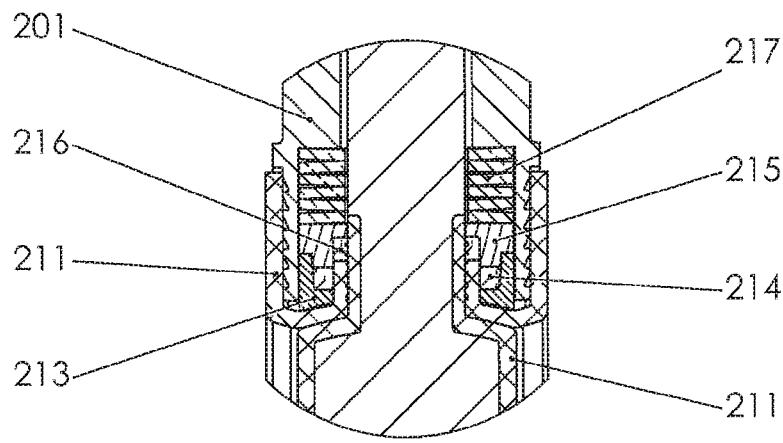
FIG. 18 is a close-up detail view of the butterfly valve, stem seal.
Figure 22:
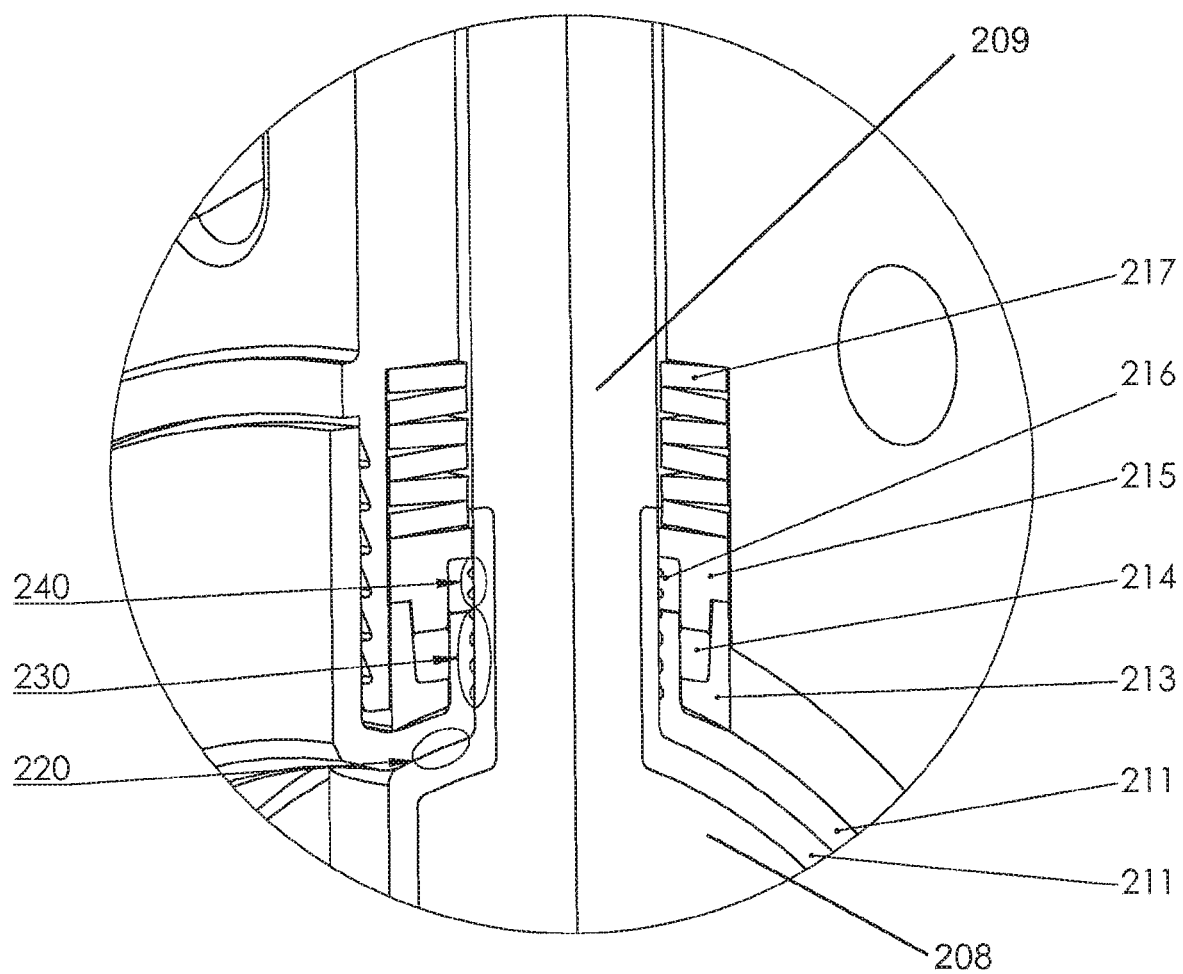
FIG. 22 is a close-up detail view of an embodiment of the stem sealing assembly for the butterfly valve shown in FIG. 21.

An embodiment of the first stem seal assembly for the butterfly valve 200 is shown in FIGS. 17, 18 and 22. The first stem seal assembly comprises a first pusher 213, a first energizer 214, a second pusher 215, a second energizer 216, and a force transmitting member 217. The first stem seal assembly is a dynamic sealing system that has the advantages of being virtually maintenance free and requiring no adjustment in the field. The first stem seal assembly may also serve as a bearing and assist with reducing lateral forces that may be placed on the flow-element 208 and stem 209.

The first pusher 213 can be seated in the annular space, and have a groove configured to recede the first energizer 214. When the first pusher 213 is subjected to an axial load or force, it creates a primary seal 220 between the flow-element 208 and the top body half 201. Where the liner 211 is secured to the flow-element 208 and top body half 201, the primary seal 220 can be created between the respective liners 211. The first pusher 213 may be constructed from any material sufficiently resistant to the media passing through the butterfly valve 200. Suitable materials include, but are not limited to, metals such as stainless steel.

The first energizer 214 can be seated in the groove of the first pusher 213. When the first energizer 214 is subjected to an axial force, it expands radially creating a secondary seal 230. When the first energizer 214 expands, it transmits the force radially to the top body half 201, which creates the secondary seal 230 between the top body half 201 and stem 209. Where the liner 211 is secured to the top body half 201 and stem 209, the secondary seal 230 can be created between the respective liners 211. The top body half 201 or its liner 211 may also include a plurality of ribs for creating multiple interface points with the stem 209 or its liner 211. These multiple interface points permit the secondary seal 230 to create multiple seals where the liner ribs interface with the stem 209. The first energizer 214 may be constructed from any material capable of expanding radially when subjected to an axial force. Suitable materials include but are not limited to a synthetic rubber and fluoropolymer elastomer such as Viton, or other suitable material.

The second pusher 215 can be positioned above the first energizer 214. The second pusher 215 has a groove configured to receive the second energizer 216, and is configured to transmit an axial force to the first energizer 214, second energizer 216 and first pusher 215. The second pusher 215 may be constructed from any material sufficiently resistant to the media passing through the butterfly valve 200. Suitable materials include metals such as stainless steel.

The second energizer 216 can be positioned in the groove of the second pusher 215. When the second energizer 216 is subjected to an axial force, it expands radially creating a tertiary seal 240. When the second energizer 216 expands, it transmits the force radially creating the tertiary seal 240 between the second energizer 216 and stem 209. Where the liner 211 is secured to the stem 209, the tertiary seal 240 can be created between the liner 211 and second energizer 216.

The surface of the second energizer 216 that interfaces with the stem 209 or its liner 211 may have a plurality of ribs configured for creating multiple points of contact between the second energizer 216 and the surface(s) it contacts. For example, when the second energizer 216 is subjected to an axial force, it can transmits the force radially, which creates multiple seals where the second energizer ribs contact the stem 209 or its liner 211. The second energizer 216 may be constructed from any material capable of expanding radially when subjected to an axial force. Suitable materials include but are not limited to a synthetic rubber and fluoropolymer elastomer such as Viton, or other suitable material.

The force transmitting member 217 is seated above the second pusher 215, and is configured to transfer an axial force to the second pusher 217. The second pusher 215 is configured to transfer the axial force to the second energizer 216, first energizer 214 and first pusher 213. As discussed above, when the first energizer 214 and second energizer 216 are subjected to an axial force, they expand radially and push outward, which create seals. The force transmitting member 219 may be any conventional means configured to transfer an axial force when loaded. An example of a suitable force transmitting member includes, but is not limited to, a spring washer such as a Belleville spring washer.

In operation, as the force transmitting member 217 is loaded, it transfers an axial force to second pusher 215. The second pusher 215 then transfers the axial force to second energizer 216, first energizer 214 and first pusher 213. The axial force applied to the first energizer 214 and second energizer 216 causes them to expand radially and push outward, which creates the secondary seal and tertiary seal between the stem 209 and the top body half 201. The axial force applied to the first pusher 213 it creates a primary seal 220 between the flow-element 208 and the body liner.

Figure 20:
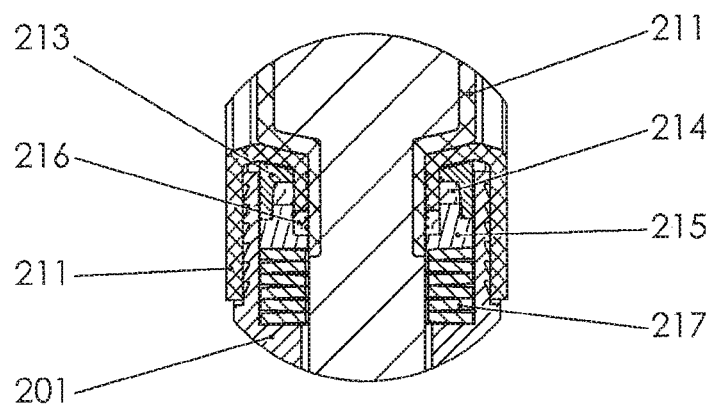
FIG. 20 is a close-up detail view of an embodiment of the second sealing assembly between the bottom body half and flow element in the butterfly valve shown in FIG. 14.
Figure 21:
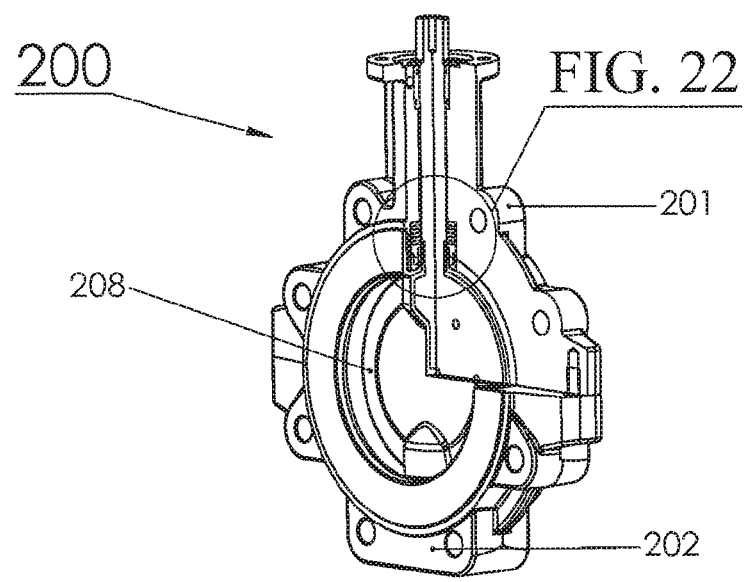
FIG. 21 is perspective view of the butterfly valve shown FIG. 14.

As discussed above, the butterfly can include the second seal assembly (FIG. 20) positioned in the area between the bottom body half 202 and the flow element 208. As shown in FIG. 20, the second seal assembly is configured in the same manner as the first stem seal assembly. That is, the second stem seal assembly comprises a first pusher 213, a first energizer 214, a second pusher 215, a second energizer 216, and a force transmitting member 217. The second seal assembly also operates in a similar fashion as described above n relation to the first stem sealing assembly.

Any reference to patents, documents and other writings contained herein shall not be construed as an admission as to their status with respect to being or not being prior art. Although the present invention and its advantages have been described in detail, it is understood that the array of features and embodiments taught herein may be combined and rearranged in a large number of additional combinations not directly disclosed, as will be apparent to one having ordinary skill in the art.

Moreover, it should be understood that various changes, substitutions and alterations can be made herein without departing from the spirit and score of the invention as defined by the following claims. There are, of course, other alternate embodiments, which are obvious from the foregoing descriptions of the invention, which are intended to be included within the scope of the invention, as defined by the following claims.

What is claimed is:
1. A valve comprising:
    a. a body having a first port and a second port with a passage configured to flow a media extending between said first port and said second port, wherein said body has a flow-element positioned between said first port and said second port;
    b. a stem secured to said flow-element and an actuator, wherein said stem extends through a stem port located on said body and is configured to actuate said flow-element;
    c. a bonnet secured to said body; and
    d. a sealing assembly substantially adjacent to said stem and configured to fit within an annular space between said stem, said body, and said bonnet, said sealing assembly comprising:
        (I) a primary seal having a cavity between its inner and outer circumference, wherein said cavity comprises at least two sidewalls that are substantially orthogonal to a bottom wall;
        (ii) a primary shaft insert configured to fit within said cavity of said primary seal;
        (iii) a sealing element located above said primary seal;
        (iv) a spacer located above said primary seal; and
        (v) a force transmitting member configured to transfer a sustained axial load to said primary shaft insert independently of the actuation of said flow element, wherein said primary shaft insert is configured to transfer said axial load radially to said primary seal creating a seal with the walls of said annular space.

2. The valve of claim 1, wherein said primary seal has a plurality of ribs located on the inner and outer circumference of said primary seal, wherein said ribs are configured to enact a seal with the walls of said annular space.

3. The valve of claim 2, wherein said cavity is a U-cup shape extending between the inner and outer circumference of the primary seal and from the top to the bottom of the primary seal.

4. The valve of claim 1, wherein said valve has a resistant liner secured to the surface of the valve.

5. The valve of claim 4, wherein said liner is secured to the surface of said valve by a series of dovetail groves and interlocking holes.

6. The valve of claim 1, wherein said body further comprises a first body half secured to a second body half, wherein a body joint is encapsulated within a liner on said body and located where said first body half is secured to said second body half.

7. The valve of claim 6, wherein said body joint has several ridges extending between the inner and outer circumference of said body joint capable of energizing when subject to a force.

8. The valve of claim 1, wherein said sealing assembly further comprises:
    a. a secondary seal seated above said spacer, wherein said secondary seal has a cavity between its inner circumference and outer circumference configured to receive said secondary shaft insert and a plurality of ribs located on its inner and outer circumference, wherein said ribs are configured to enact a seal with the walls of said annular space; and
    b. a secondary shaft insert seated above said spacer, wherein said secondary shaft insert is configured to fit within said cavity of said secondary seal and to transfer said axial load from said force transmitting radially to said secondary seal creating a seal with the walls of said annular space.

9. The valve of claim 1, wherein a notched interface is provided between said bonnet and said body, said interface configured to eliminate rotational forces from being translated to the bonnet.

10. The valve of claim 1, wherein said spacer has an aperture and aligns with a leakoff connection on said valve.

11. A stem seal assembly for a valve configured to fit within an annular space surrounding a valve stem, said stem seal assembly comprising:
   a. a primary seal, wherein said primary seal has a cavity between its inner circumference and outer circumference, wherein said cavity comprises at least two sidewalls that are substantially orthogonal to a bottom wall;
   b. a primary shaft insert configured to fit into said primary seal cavity;
   c. a sealing element located above said primary seal;
   d. a bottom gasket;
   e. a spacer located above said primary seal; and
   f. a force transmitting member seated above said primary seal and configured to transfer a sustained axial load to said primary shaft insert upon completion of said valve, wherein said primary shaft insert is configured to transfer said axial load radially to said primary seal creating a seal with the walls of said annular space.

12. The stem seal assembly of claim 11 wherein said primary seal has a plurality of ribs located on the inner and outer circumference of said primary seal, wherein said ribs are configured to enact a seal with the walls of said annular space.

13. The stem seal assembly of claim 12 wherein said spacer has an aperture configured to align with a leakoff connection on said valve.

14. A stem seal assembly for a valve configured to fit within an annular space surrounding a valve stem, said stem seal assembly comprising:
   a. a primary seal, wherein said primary seal has a U-cup shaped cavity between its inner circumference and outer circumference, wherein said cavity extends between the inner and outer circumference of the primary seal and from the top to the bottom of the primary seal;
   b. a primary shaft insert configured to fit into said primary seal cavity;
   c. a sealing element located above said primary seal;
   d. a bottom gasket;
   e. a secondary seal seated above said primary seal, wherein said secondary seal has a U-cup shaped cavity between its inner circumference and outer circumference, wherein said cavity extends between the inner and outer circumference of said secondary seal and from the top to the bottom of said secondary seal;
   f. a secondary shaft insert seated above said primary seal and configured to fit into said secondary seal cavity;
   g. a spacer located between said primary seal and said secondary seal; and
   h. a force transmitting member seated above said secondary seal and configured to transfer a sustained axial load to said primary shaft insert and said secondary shaft insert upon completion of said valve, wherein said primary shaft insert is configured to transfer said axial load radially to said primary seal creating a seal with the walls of said annular space, wherein said secondary shaft insert is configured to transfer said axial load radially to said secondary seal creating a seal with the walls of said annular space.

15. The stem seal assembly of claim 14, wherein a plurality of ribs are located on the inner and outer circumference of said primary seal and secondary seal, wherein said ribs are configured to enact a seal with the walls of said annular space.

16. The stem seal assembly of claim 15, wherein said spacer has an aperture configured to align with a leakoff connection on said valve.

17. A valve comprising:
   a. a body having:
      (I) a first port and a second port with a passage configured to flow a media extending between said first port and said second port, wherein said body has a flow-element positioned between said first port and said second port; and
      (ii) a first body half secured to a second body half, wherein a body joint is encapsulated in a liner on said body and located where said first body half is secured to said second body half; wherein said body joint has several ridges extending between the inner and outer circumference of said body joint and capable of energizing when subject to a force;
   b. a stem secured to said flow-element and an actuator, wherein said stem extends through a stem port located on said body and is configured to actuate said flow-element;
   c. a bonnet secured to said body; and
   d. a sealing assembly substantially adjacent to said stem and configured to fit within an annular space, said sealing assembly comprising:
      (I) a primary seal having a U-cup shaped cavity between its inner and outer circumference, wherein said primary seal has a plurality of ribs located on its inner and outer circumference that are configured to enact a seal with the walls of said annular space;
      (ii) a primary shaft insert configured to fit within said cavity of said primary seal;
      (iii) a sealing element located above said primary seal;
      (iv) a bottom gasket;
      (v) a spacer located above said primary seal; and
      (vi) a force transmitting member configured to transfer a sustained axial load to said primary shaft insert independently of the actuation of said flow element, wherein said primary shaft insert is configured to transfer said axial load radially to said primary seal creating a seal with the walls of said annular space.

18. The valve of claim 17, wherein said sealing assembly further comprises:
   a. a secondary seal seated above said spacer, wherein said secondary seal has a cavity between its inner circumference and outer circumference configured to receive said secondary shaft insert and a plurality of ribs located on its inner and outer circumference, wherein said ribs are configured to enact a seal with the walls of said annular space; and
   b. a secondary shaft insert seated above said spacer, wherein said secondary shaft insert is configured to fit within said cavity of said secondary seal and to transfer said axial load from said force transmitting radially to said secondary seal creating a seal with the walls of said annular space.

19. The valve of claim 18, wherein a notched interface is provided between said bonnet and said body, said interface configured to eliminate the translation of rotational forces to the bonnet.

20. A valve comprising:
   a. a body having a first port and a second port with a passage configured to flow a media extending between the first port and the second port, wherein the body has a flow-element positioned between the first port and the second port;

b. a stem secured to the flow-element and an actuator, wherein the stem extends through a stem port located on the body and is configured to actuate the flow-element;
c. a bonnet secured to the body; and
d. a sealing assembly adjacent to the stem and configured to fit within an annular space between the stem, the body, and the bonnet, the sealing assembly comprising a primary seal having a cavity formed between its inner and outer circumference walls, a primary shaft insert configured to fit within the cavity, and a force transmitting member configured to continuously transfer an axial load to the primary shaft insert, wherein the primary shaft insert is configured to transfer the axial load radially to the primary seal creating a seal between the body or the bonnet and the stem.

21. The valve of claim 20, wherein the sealing assembly further comprises a spacer positioned between the force transmitting member and the primary shaft insert to continuously receive the axial load from the force transmitting member and continuously apply the axial load to the primary shaft insert.

22. The valve of claim 21, wherein the inner and outer circumference walls of the primary seal are shaped having a plurality of ribs positioned and shaped to enact the seal between the stem and the body.

23. The valve of claim 20, wherein the bonnet comprises part of the body.

24. The valve of claim 20, wherein the sealing assembly further comprises:
a. a spacer positioned above the primary shaft insert;
b. a sealing element seated on the primary shaft insert and below the spacer; and
c. a bottom gasket positioned below the primary seal.

* * * * *